United States Patent
Timmer et al.

(10) Patent No.: US 6,643,738 B2
(45) Date of Patent: Nov. 4, 2003

(54) DATA PROCESSOR UTILIZING SET-ASSOCIATIVE CACHE MEMORY FOR STREAM AND NON-STREAM MEMORY ADDRESSES

(75) Inventors: Adwin Hugo Timmer, Eindhoven (NL); Françoise Jeannette Harmsze, Eindhoven (NL); Jeroen Anton Johan Leijten, Eindhoven (NL); Jozef Louis Van Meerbergen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 42 days.

(21) Appl. No.: 09/734,773

(22) Filed: Dec. 12, 2000

(65) Prior Publication Data
US 2002/0004876 A1 Jan. 10, 2002

(30) Foreign Application Priority Data
Dec. 17, 1999 (EP) .............................. 99204375

(51) Int. Cl.[7] .............................................. G06F 12/02
(52) U.S. Cl. ..................... 711/128; 711/100; 711/118; 711/154
(58) Field of Search ............................. 711/100, 118, 711/122, 128, 136, 154

(56) References Cited

U.S. PATENT DOCUMENTS

| | | | | |
|---|---|---|---|---|
| 5,070,502 A | * | 12/1991 | Supnik ........................... | 714/8 |
| 5,353,424 A | * | 10/1994 | Partovi et al. ............... | 711/128 |
| 5,450,564 A | * | 9/1995 | Hassler et al. ............... | 711/158 |
| 5,509,135 A | * | 4/1996 | Steely, Jr. .................... | 711/147 |
| 5,715,427 A | * | 2/1998 | Barrera et al. ............... | 711/136 |
| 6,047,357 A | * | 4/2000 | Bannon et al. .............. | 711/133 |
| 6,115,792 A | * | 9/2000 | Tran ........................... | 711/128 |

* cited by examiner

*Primary Examiner*—Tuan V. Thai
(74) *Attorney, Agent, or Firm*—Daniel J. Piotroski

(57) ABSTRACT

A data processor has a cache memory with an associative memory for storing at least a first and second groups of associations between a respective main memory addresses and cache memory locations. At least one cache memory location is dynamically assignable to different ones of the groups for use in associations of the assigned group. When an instruction indicates a main memory address a group is selected group for finding the cache memory location associated with the main memory address. In an embodiment, the processor accesses streams of addresses from iteratively computed main memory addresses. Each stream has its own group of associations of addresses from the stream with cache memory locations assigned to that group. The remaining cache memory locations are accessed with set associative mapping. Thus, cache memory locations can be assigned to different streams on an "as needed" basis and the remaining cache memory locations can be used for non-stream addresses.

2 Claims, 1 Drawing Sheet

DATA PROCESSOR UTILIZING SET-ASSOCIATIVE CACHE MEMORY FOR STREAM AND NON-STREAM MEMORY ADDRESSES

Cache memory is conventionally used to speed up access to data from a main memory. Each cache memory location can be used as a placeholder for a selectable one of a number of main memory locations. When a main memory address is issued to access data, the cache memory determines the cache memory location that acts as placeholder for the main memory location that is addressed by the main memory address. This cache memory location is subsequently used instead of the main memory location.

The determination of the cache memory location from the main memory address will be called address mapping. The type of address mapping used in the cache memory is an important design parameter of the cache memory. Different types of address mapping are used in fully associative caches, set-associative caches and direct-mapped caches. The fully associative cache contains an address mapping unit that can map each main memory address (or memory block address) to any cache location (or block of locations). This requires an address-mapping unit that, given a main memory address, determines which, if any, of the cache locations is currently associated with that main memory address. For this purpose the mapping unit has to perform a costly associative memory function, which potentially slows down access speed.

In a direct mapped cache on the other hand, there is no choice as to which cache memory location corresponds to a main memory address: a given main memory address can map only to a single cache memory location. Thus an address-mapping unit in the direct cache can easily determine the required cache memory location. However, when the cache memory location is already in use for another main memory address, the data for that other main memory address will have to be removed from the cache memory, even if that data is still useful. This is a disadvantage compared with the fully associative cache, which can store data for any combination of main memory addresses.

A set-associative cache is a compromise between the direct mapped cache and the fully associative cache. The set-associative cache uses sets of cache memory locations (a set being smaller than the whole cache memory). Each memory address corresponds to a set. The main memory address can be associated with any cache location in its corresponding set of cache memory locations. Thus, on one hand it is easier to determine a cache memory location from a main memory address, because the associative memory function has to be performed only within the set corresponding to that main memory address. On the other hand, data has to be removed from the cache less often than in a direct mapped cache, because there is a choice of memory locations within the set, so that data for combinations of main memory addresses can be stored in the set.

The fully associative cache, a set-associative cache and the direct mapped cache differ in the number of alternative cache memory locations that can be used for the same memory address. This number is a fixed design parameter and it is successively smaller for fully associative caches, set-associative caches and direct-mapped caches. The larger this number, the less frequently it will be necessary to remove useful data from the cache to make room for new data. However, making this number larger also increases the complexity of the cache and it may decrease its access speed. Thus, the choice of this number represents an important tradeoff in cache design.

Amongst others, it is an object of the invention to improve the efficiency of address mapping in a cache memory.

Amongst others, it is another object of the invention to allow for better optimization in the trade-off involved in choosing the number of alternative cache memory locations that can be used for the same memory address.

Amongst others, it is another object of the invention to allow for real-time use of a cache memory without blocking other use. In particular, it is a further object of the invention that general purpose caching schemes can be combined with stream caching mechanisms in the same cache memory, with a guarantee of real-time behavior of stream caching.

The data processor according to the invention is described in claim 1. As in set-associative mapping, this data processor limits the number of associations between main memory addresses and cache memory locations that need to be consulted to determine a cache memory location that is to be accessed. The search for an association is limited to a group of associations, as it is limited to a set in set-associative mapping. Within each group associative mapping is possible to any cache memory location assigned to the group. But in contrast to set-associative mapping, the cache memory locations are dynamically assigned to the groups. Thus, the number of assigned memory locations may can be made dependent on the needs of the program or program part that is executed. This number may vary at least between a zero and a non-zero number of cache memory locations.

By varying the size of the groups, the mapping can be adapted to the needs of the program without an overhead in cache memory locations. The program executed by the processor selects dynamically (that is, during execution of a program) which and how many memory addresses are involved in associative relations of each group. Thus, a high cache performance is can be guaranteed for those memory addresses. For example if the number of main memory addresses that can be associated simultaneously in one group is equal to the number of addresses needed for a certain real time task, real time response of the cache can be guaranteed. During one program (part) main memory addresses can be mapped to certain cache memory locations in one group and in another program main memory addresses can be mapped to those cache memory addresses in another group.

In an embodiment of the processor according to the invention the processor is arranged to prefetch or write one or more streams of data from iteratively computed main memory addresses (separated for example by a fixed address step size). At any point in time only a window of the addresses in the stream that have been used before will be used later as well. The addresses for these streams are mapped using the first group, whereas other addresses are mapped with other groups. By assigning a number of cache memory locations to the first group that is sufficient to retain associations for all the addresses in the window, it is possible to eliminate the need for to replacement data from the streams that can be reused. The remaining groups may use set associative mapping, i.e. the main memory address may be mapped directly on one of the remaining groups.

When the processor prefetches or writes multiple streams of data items from iteratively computed main memory addresses, each stream may have its own group of associations of addresses from the stream with cache memory locations assigned to that group. The remaining cache memory locations are accessed with set associative mapping. Thus, cache memory locations can be assigned to different streams on an "as needed" basis and the remaining cache memory locations can be used for non-stream addresses.

The group to be used for a memory access instruction can be selected on an instruction by instruction basis, the instructions indicating explicitly what type of address mapping should be used to access their own operands or results, i.e. by indicating a stream. Alternatively, an instruction may indicate the type of address mapping for use by other instructions, for example by specifying a range or set of main memory addresses for which a specific type of address mapping is to be used. The former is more flexible; the latter requires less instruction overhead.

Cache memory locations used for one group will generally not be available for use in another group. When set associative mapping is used for main memory addresses that do not belong to any stream, removal of a cache address from a set reduces the effectivity of that set. Preferably, the cache memory addresses that are used for a group that supports a stream are selected evenly from different sets used in set associative mapping. Thus, it is avoided that for some sets the number of available alternative cache memory addresses is much smaller than the number of such available alternative cache memory addresses for other sets. This minimizes the need for cache replacement using set-associative mapping.

In another embodiment of the processor according to the invention separate cache replacement decisions are taken for the cache memory locations involved in different groups. Replacement is needed if a new main memory address has to be mapped to a cache memory location, but no free cache memory location is available. In this cache a cache memory location must be selected for reuse by the new main memory address, at the expense of the old main memory address that maps to the cache memory location. A well known strategy is to reuse the cache memory location that has been least recently used.

These and other advantageous aspects of the data processor according to the invention will be illustrated in a non-limitative way, using the following figures.

Figure 1:
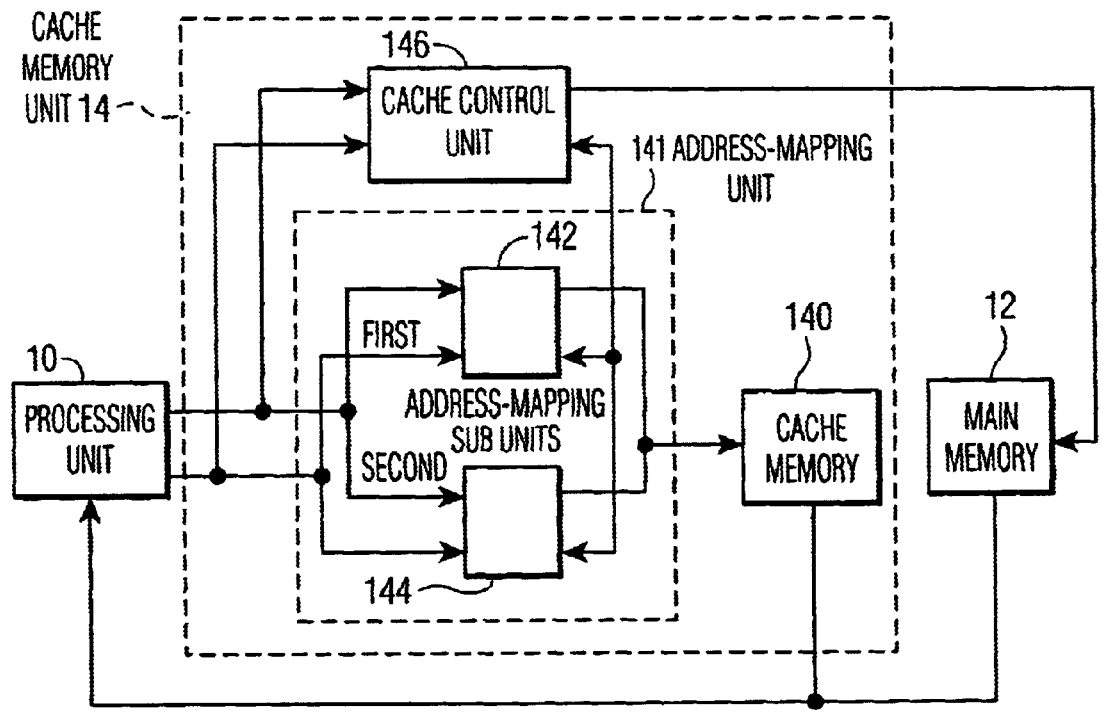
FIG. 1 shows a data processor with a cache memory

FIG. 1 shows a data processor that comprises a processing unit 10, a main memory 12 and a cache memory unit 14. The cache memory unit 14 contains a cache memory 140, a cache control unit 146 and an address-mapping unit 141, comprising a first and second address-mapping sub-unit 142, 144. The processing unit 10 has an address output and a cache mechanism selection output coupled to the address mapping units 142, 144 and the cache control unit 146. The address mapping units 142, 144 and the cache control unit have a cache address output coupled to the cache memory 140. The address mapping units 142, 144 have a cache miss handling interface coupled to the cache control unit 146. The cache control unit has a main memory address output coupled to the main memory 12. The main memory 12 has a data output coupled to the cache memory 140.

In operation, the processing unit 10 executes a program that causes it to issue a main memory address for reading or writing data, in combination with implicit or explicit information that indicates a cache address mapping unit 142, 144 that is to be used for that main memory address. The signal selects the appropriate one of the address mapping units 142, 144, which determines whether the data corresponding to the address is present in the cache memory 140. If so, the corresponding cache memory address is retrieved and supplied to the cache memory 140. In response, the cache memory 140 supplies the data for that address to the processing unit 10.

The cache control unit 146 determines which cache memory locations may be mapped to by the first address mapping unit 142. This is done under program control. A program executing in the processor indicates how many cache memory locations are needed for mapping with the first address mapping unit. Thereupon, the cache control unit selects a sufficient number of those locations and signals the selected locations to the cache mapping unit, so that main memory addresses can be mapped to those locations. Cache control unit 146 contains for example a suitably programmed microcontroller core to perform these functions.

Of course, there may be any number of cache mapping units 142, 144, each with its own dynamically selected group of cache memory addresses to which the cache mapping unit can map main memory addresses.

If a main memory address is signaled to the cache mapping units 142, 144 and the selected address mapping unit 142, 144 does not detect that the data corresponding to the main memory address is present in the cache memory 140, there is a cache miss for the main memory address. The address mapping unit 142, 144 signals the cache miss to the cache control unit 146. The cache control unit 146 supplies the main memory address to the main memory 12 to fetch the data for that address. The cache control unit selects a cache mapping unit 142, 144 for the address. The cache control unit 146 also selects a cache memory address for the data from the cache memory addresses assigned to that cache mapping unit 146. The data from main memory 12 is stored in cache memory 140 at the selected cache memory address and supplied to the processing unit 10.

The cache control unit 146 signals the selected cache memory address to the cache mapping units 142, 144. If the cache memory address was in use for another main memory address, the cache mapping units 142, 146 ensure that that other main memory address will no longer be mapped to the selected cache memory address. At least the selected one of the cache mapping units 142, 144 records that data has been stored in cache memory 140 for the main memory address at the selected cache memory address. In an embodiment, both cache mapping units 142, 144 record the association between the cache memory address and the main memory address at least for some cache memory addresses.

If all cache memory addresses assigned to the cache mapping units 142, 144 are in use, the cache control unit 146 selects the selected cache memory address according to some cache replacement strategy and dependent on the address mapping used in the selected cache-mapping unit 142, 144. Several strategies are known per se to the skilled person. An example of a strategy is the "least recently used" (LRU) strategy. According to this strategy, the cache control unit 146 determines which of the cache memory addresses has not been used longer than any other cache memory address. That LRU cache memory address is then selected for storing data for the main memory location.

Dependent on the type of address mapping used by the address mapping unit 142, 144, only a subset of the addresses in cache memory 140 may be available for the main memory address that caused the cache miss. In that case, the cache control unit selects the cache memory address from the cache memory addresses that are available for the main memory address in the selected cache-mapping unit 142, 144, again according to some strategy such as LRU.

Address mapping units 142, 144 may use mutually different address mapping mechanisms. In an embodiment the first address mapping unit 142 uses fully associative address mapping to a dynamically selected, limited set of cache memory addresses and the second address mapping unit 144 uses set associative mapping to all cache memory address, preferably minus those used in the first address mapping unit 142. Implementations of address mapping units for these and other kinds of mapping are known per se.

Usually, data from main memory 10 is fetched and stored in cache memory 140 in units of cache lines, each of which comprises data for a plurality of successive addresses with the same most significant bits. In a fully associative mapping unit these most significant bits (the tag bits) of those main memory addresses that are represented in cache memory 140 are stored for each cache memory address that can be mapped by the fully associative mapping unit. The tag bits of an incoming main memory address are compared with the tag bits of stored addresses. If there is a match, the associated cache memory address is returned. In a set associative mapping unit the most significant part of the main memory address is divided into set selection bits and tag bits. The set selection bits are translated into cache address bits in a predetermined way. These cache address bits select a set of cache memory locations. This leaves a limited number of cache memory addresses in the set that can be used for the main memory address. The tag bits are used to select among this limited number of cache memory addresses, just as the tag bits are used in the fully associative mapping unit to select among all usable cache memory addresses.

By using a fully associative mapping unit with an assignable group of cache memory addresses for certain critical data, such as data that needs to be processed in real time, it is possible to cache data without the limitations imposed by set-associative caching or direct mapped caching. In combination with a set-associative mapping unit, the fully associative cache mapping unit may map main memory addresses to cache memory locations that belong to different sets (as defined by the set-associative cache mapping unit), even when the set-associative mapping unit would map them to the same set. Thus, more main memory locations that map to the same set can be present in cache memory 140 than would be possible using a set-associative cache mapping unit on its own. The fully associative cache does not need to provide the ability to map to all of the cache memory 140 in this case, because unmapped addresses are still useful for the other mapping mechanism. Hence the fully associative cache-mapping unit may be kept small. Different cache replacement strategies may be used for cache memory addresses that are mapped by different cache mapping units 142, 144.

The fully associative mapping unit may be limited to special types of memory access. For example, in case of a program that uses stream access, a part of the main memory addresses comes from a series of addresses that can be computed in advance (for example addresses at fixed distances from one another). In stream access, the main memory addresses that can be used at a point in time lie in a window in the series (i.e. of all addresses in the stream that have been used before the point in time only those in the window can be used later). This window shifts in time. The cache memory 140 has to store data for the addresses in the window. That is, the cache memory 140 stores data for a window of successive addresses in the series. The data accessed in this way may involve prefetched data for reading by the processor and/or data written by the processor at the computed addresses.

Stream prefetching and writing is known per se. Preferably, stream prefetching is implemented using a stream prefetch unit (not shown), which monitors addresses or address indications issued by the processor and compares them with a current stream address. Either all issued addresses are compared or only those addresses or indications that the processor identifies as stream addresses. If there is a match, the stream prefetch unit computes a next main memory address in the stream and submits this address to the cache in order to cause the data corresponding to this address to be stored in the cache memory.

Figure 2:
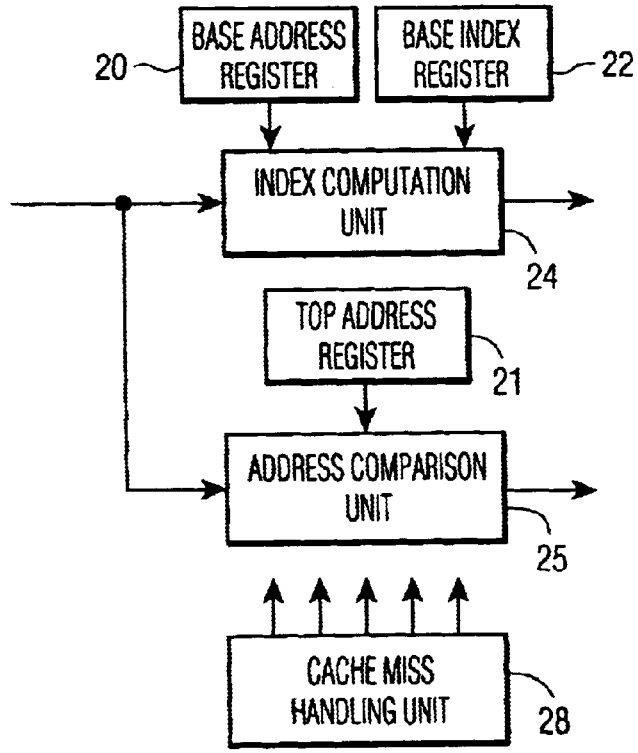
FIG. 2 shows a fully associative cache-mapping unit for stream access

FIG. 2 shows a fully associative mapping unit for stream access. The mapping unit contains a base address register 20, a top address register 21, a base index register 22, an index computation unit 24, an address comparison unit 25 and an address memory 26 all coupled to the cache miss handling interface 28 (connections not shown for clarity). The address input of the mapping unit is coupled to the index computation unit 24 and the address comparison unit 25. The base address register 20 is coupled to the index computation unit 24. The top address register 21 is coupled to the address comparison unit 25. The base index register 22 is coupled to the index computation unit 24. The index computation unit 24 has an index output coupled to the address memory 26. The address memory 26 has an input coupled to the mapping mechanism selection input of the mapping unit and an output coupled to the address output of the mapping unit.

In operation the mapping unit serves to supply cache memory addresses for a window in the series of cache memory addresses used in stream access. A fixed set of cache memory addresses is used for the stream. When the window advances data from a new main memory address in the series overwrites data for the oldest main memory address that is still in cache memory 140, except initially when no data from the series is present as yet. The cache control unit 146 loads the address memory 26 with a number of cache memory addresses for storing data for the stream. These cache memory address that will not normally be changed as the window advances. These cache memory addresses will be used cyclically for the addresses in the series. This has the advantage that the cache memory addresses can be computed without comparison of the main memory address with all available address, as in the case of conventional fully associative mapping units.

Base address register 20 contains the oldest main memory address A0 from the series that is present in cache memory 140. Top address register 21 contains the youngest main memory address AN from the series that is present in cache memory 140. Base index register 22 contains the address I0 of a location in address memory 26 that contains the cache address that stores data for the oldest main memory address.

When the mapping unit is selected and a main memory address A is supplied, index computation unit 24 translates this main memory address A into an index I that addresses address memory 26. For example, if the distance between successive main memory addresses in the stream is "D", I=(I0+(A−A0)/D) mod N (where N is the number of addresses in address memory 26). With the index I the cache memory address corresponding to main memory address A is retrieved from address memory 26.

Address comparison unit 25 signals when a main memory address outside the currently stored window is used. If so, cache control unit 146 loads data for that main memory address from main memory 12 into cache memory 140 at address A0 and updates A0, AN and I0. Preferably, data for the stream is prefetched, that is, its main memory address is applied to cache memory unit 14 before the program actually needs the data. Thus, no cache miss delay need be incurred. In an embodiment, the addresses supplied to the mapping unit of FIG. 2 are stream relative addresses instead of main memory addresses. In this case, computation of the index I in address memory 26 is merely a matter of taking the modulus I=A mod N of the supplied address.

Thus, data for the cached main memory addresses is stored in a series of cache memory locations, which are used cyclically for successive addresses from a stream of addresses. Indices in the series are computed from the addresses from the stream and used to determine the addresses in the series. In the example, the latter is realized by means of an address memory, but of course other realizations may be used, such as using the index directly to address the cache memory relative to some base address.

Of course, the mapping unit of FIG. 2 is but an advantageous example of a mapping unit. Without deviating from the invention other fully associative mapping units may be used.

Returning now to FIG. 1, it will be remembered that cache control unit 146 selects a cache memory address for a main memory location on a cache miss. In one embodiment, wherein the cache mapping unit 142, 144 are a fully associative mapping unit and a set-associative mapping unit respectively, the cache control unit 146 selects the cache memory addresses for use by the fully associative mapping unit so that they are evenly spread out over the different sets of the set-associative mapping unit.

It will be remembered that the fully associative mapping unit has full freedom of associating a main memory address with any cache memory address. The set-associative mapping unit on the other hand can map a main memory address only to one of a number of cache memory addresses in a relatively small set. When the fully associative mapping unit maps a main memory address to a cache memory address, that cache memory address will be said to be "occupied" by the fully associated mapping unit. Only those cache memory address in a set that are not "occupied" by the fully associative cache mapping unit can be used by the set-associative mapping unit without interfering with the fully associative mapping unit. usually, occupation is enforced by some hardware locking mechanism that disables replacement in the cache at occupied locations by the set associative mapping unit.

In an extreme situation, all of the cache memory addresses in a set may be occupied. In that case, a cache miss for a main memory address that maps to that set cannot be handled by updating the set-associative mapping unit without invalidating main memory addresses mapped by the fully associative mapping unit. Also, if a large fraction of a set is occupied, cached data may have to be replaced so often that the advantages of a set-associative mapping unit are lost.

This is avoided by evenly spreading the occupied cache memory addresses over the different sets used by the set associative mapping unit. That is, cache control unit 146 preferably selects cache memory addresses for fully associative mapping avoiding cache memory addresses from those sets that contain more occupied cache memory addresses than other sets. Thus the maximum number of cache memory addresses that is occupied in any set is minimized.

In an embodiment, the cache control unit 146 maintains a linked list of cache memory addresses that are not used by the fully associative mapping unit. Initially, this list cycles through the sets: cache memory addresses that appear successively in this list belong to successively different sets, until cache memory addresses from all set have appeared and from there the list runs through all sets again and so on. For example, the list may contain (A0, A1, A2, A3, A4, A5, A6, A7, A8, A9 . . . ) successively, where A0, A4, A8 belong to a first set, A1, A5, A9 belong to a second set, A2, A6 belong to a third set and so on. In this case, when the cache control unit 146 needs to select cache memory addresses for use in the fully associative mapping unit, the cache control unit selects these cache memory in the order that they appear in the list.

When cache memory addresses are released from use in the fully associative cache, they are put back in the list in a sequence that preserves the property that successive addresses from the same set are separated by addresses from a maximum possible number of addresses from other sets.

In case of the cache mapping unit of FIG. 2, a program run by the processing unit 10 preferably declares a stream when it starts using that stream, the declaration specifying implicitly or explicitly a number of cache memory addresses that is to be used for the stream. When the stream starts the required number of cache memory locations is taken from successive positions in the list.

Various techniques may be used for selecting the cache-mapping unit 144, 146 that handles a given main memory address. One example of such a technique is used in conjunction with stream access. In this case, the processing unit 10 outputs a signal indicating whether a memory address belongs to a stream and, if so, to which stream. The signal selects the cache-mapping unit 142, 144 that is to be used. If there is a cache miss, the signal also enables the cache control unit 146 to select the cache mapping unit 142, 146 that has to map the main memory address. The processing unit 10 may issue the main memory address in the form of a complete address or in the form of an index relative to a current window in the stream.

In another example, the selected cache-mapping unit is determined by checking whether the main memory address issued by the processing unit 10 belongs to a specified range or collection of addresses. A program instruction defines a ranges or collection of main memory addresses which must be mapped by the fully associative cache mapping unit. If there is a cache miss, the cache control unit 146 selects the cache mapping unit 142, 146 that has to map the main memory address on the basis of whether it belongs to such a range or collection. Belonging to such a range or collection may also be used to select the address-mapping unit 142, 144 during normal address mapping.

In an embodiment, all address mapping units 142, 144 in parallel may try to determine a cache memory address for a main memory address issued by the processing unit 10. If any one of the cache mapping units 142, 144 does not report a cache miss, the cache memory address produced by that cache mapping unit 142, 144 may be used to address cache memory 140. If all of the cache mapping units 142, 144 report a cache miss, the cache control unit 146 is triggered to fetch data from main memory 12. If more than one address mapping unit 142, 144 reports a cache hit, only one of the cache memory addresses reported by the address mapping units 142, 144 needs to be used for a memory read operation. In case of a memory write operation, the data may be written to all reported cache memory locations, or only to one of the reported locations, the data in the other reported locations being invalidated.

What is claimed is:

1. A data processor with a cache memory, the cache memory comprising:

an input for receiving a main memory address;

a plurality of cache memory locations;

an associative memory for storing at least a first and second groups of associations for mapping the main memory address to the plurality of cache memory locations, one or more cache memory location of the plurality of cache memory locations being dynamically assignable to either of the first or second group for use in associations;

selection means for selecting a selected group for the main memory address; and an address mapping unit arranged for selecting and addressing an addressed cache memory location that is associated with the main memory address in the selected group;

wherein a stream access unit for accessing data in the cache memory for a stream of iteratively computed main memory addresses, the data processor being arranged to associate the main memory addresses of accessed data from the stream upon access for that stream all to cache memory locations using associations of the first group;

wherein the address mapping unit maps the main memory addresses for which the first group is selected on the basis of their rank number in the stream.

2. A data processor with a cache memory, the cache memory comprising:

an input for receiving a main memory address;

a plurality of cache memory locations;

an associative memory for storing at least a first and second groups of associations for mapping the main memory address to the plurality of cache memory locations, one or more cache memory location of the plurality of cache memory locations being dynamically assignable to either of the first or second group for use in associations;

selection means for selecting a selected group for the main memory address; and an address mapping unit arranged for selecting and addressing an addressed cache memory location that is associated with the main memory address in the selected group;

wherein a stream access unit for accessing data in the cache memory for a stream of iteratively computed main memory addresses, the data processor being arranged to associate the main memory addresses of accessed data from the stream upon access for that stream all to cache memory locations using associations of the first group;

wherein a stream access unit for accessing data for two or more streams of iteratively computed main memory addresses into the cache memory, the main memory addresses of accessed data from each stream upon such access all being associated to cache memory locations using associations of a respective one of the groups allocated to that stream.

* * * * *